US 9,501,857 B2

(12) United States Patent
Itoh et al.

(10) Patent No.: US 9,501,857 B2
(45) Date of Patent: Nov. 22, 2016

(54) DISPLAY CONTROL METHOD CONFIGURED TO CAUSE AN INPUT IMAGE TO EMERGE AND MOVE ON A DISPLAY REGION, DISPLAY CONTROL DEVICE, AND DISPLAY SYSTEM CONFIGURED TO PERFORM SAME

(71) Applicants: Atsushi Itoh, Kanagawa (JP); Aiko Ohtsuka, Kanagawa (JP); Tetsuya Sakayori, Tokyo (JP); Hidekazu Suzuki, Tokyo (JP); Takanobu Tanaka, Kanagawa (JP)

(72) Inventors: Atsushi Itoh, Kanagawa (JP); Aiko Ohtsuka, Kanagawa (JP); Tetsuya Sakayori, Tokyo (JP); Hidekazu Suzuki, Tokyo (JP); Takanobu Tanaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 257 days.

(21) Appl. No.: 14/269,375

(22) Filed: May 5, 2014

(65) Prior Publication Data

US 2014/0333612 A1   Nov. 13, 2014

(30) Foreign Application Priority Data

May 9, 2013   (JP) ................................. 2013-099750

(51) Int. Cl.
| G06T 13/80 | (2011.01) |
| G06T 13/20 | (2011.01) |
| G09G 3/00  | (2006.01) |
| G06F 3/14  | (2006.01) |

(52) U.S. Cl.
CPC ............... G06T 13/80 (2013.01); G06T 13/20 (2013.01); G09G 3/003 (2013.01); G06F 3/1446 (2013.01); G09G 3/001 (2013.01); G09G 2300/026 (2013.01); G09G 2320/106 (2013.01)

(58) Field of Classification Search
None
See application file for complete search history.

(56) References Cited

U.S. PATENT DOCUMENTS

| 5,854,634 A | 12/1998 | Kroitor |
| 6,373,492 B1 | 4/2002 | Kroitor |
| 6,577,315 B1 | 6/2003 | Kroitor |
| 8,581,905 B2* | 11/2013 | Mitchell ................. G06T 15/20 345/419 |
| 2008/0242429 A1 | 10/2008 | Itoh et al. |
| 2009/0005162 A1 | 1/2009 | Itoh |
| 2010/0257555 A1* | 10/2010 | Dunn ................. H04N 5/44513 725/37 |
| 2011/0181606 A1* | 7/2011 | Sumner ................... G06T 13/00 345/474 |
| 2011/0306417 A1* | 12/2011 | Sheblak .................. A63F 13/10 463/32 |
| 2012/0308159 A1 | 12/2012 | Otsuka et al. |
| 2014/0267423 A1 | 9/2014 | Itoh et al. |
| 2014/0320507 A1* | 10/2014 | Myung .................. G06T 13/80 345/474 |

FOREIGN PATENT DOCUMENTS

| JP | 07-079662 | 3/1995 |
| JP | 08-051886 | 2/1996 |
| JP | 09-298977 | 11/1997 |

(Continued)

OTHER PUBLICATIONS

Translation of JP10-027962A, obtained from AIPN on Mar. 14, 2016.*

*Primary Examiner* — Carlos Perromat
(74) *Attorney, Agent, or Firm* — Harness, Dickey & Pierce, P.L.C.

(57) ABSTRACT

A display control method includes: inputting user's image including a drawing portion made by hand drawing and being a display target image; and performing image control including causing the input user's image to emerge from any one of a left end and a right end of a predetermined display region, on which the user's image is to be displayed, and moving the user's image that has emerged.

15 Claims, 13 Drawing Sheets

(56) References Cited

FOREIGN PATENT DOCUMENTS

| JP | 3327127 | 7/2002 |
|----|---------|--------|
| JP | 4161325 | 8/2008 |
| JP | 2009-000174 | 1/2009 |
| JP | 2009-101122 | 5/2009 |
| JP | 2009-131596 | 6/2009 |
| JP | 2009-273859 | 11/2009 |
| JP | 2010-012036 | 1/2010 |
| JP | 2012-249172 | 12/2012 |
| JP | 2013-230374 | 11/2013 |
| JP | 2014-149633 A | 8/2014 |
| JP | 2014-182406 A | 9/2014 |

* cited by examiner

|  | $p_0$ (MAXIMUM MOVING-DIRECTION VELOCITY) | $p_1$ (MOVING-DIRECTION ACCELERATION) | $p_2$ (MAXIMUM VALUE OF ANGULAR ACCELERATION IN HORIZONTAL PLANE) |
|---|---|---|---|
| FIRST MODE | $p_0 = m_{01} \times c_0$ | $p_1 = m_{11} \times c_1$ | $p_2 = m_{21} \times c_2$ |
| SECOND MODE | $p_0 = m_{02} \times c_0$ | $p_1 = m_{12} \times c_1$ | $p_2 = m_{22} \times c_2$ |
| THIRD MODE | $p_0 = m_{03} \times c_0$ | $p_1 = m_{13} \times c_1$ | $p_2 = m_{23} \times c_2$ |

DISPLAY CONTROL METHOD CONFIGURED TO CAUSE AN INPUT IMAGE TO EMERGE AND MOVE ON A DISPLAY REGION, DISPLAY CONTROL DEVICE, AND DISPLAY SYSTEM CONFIGURED TO PERFORM SAME

CROSS-REFERENCE TO RELATED APPLICATIONS

The present application claims priority to and incorporates by reference the entire contents of Japanese Patent Application No. 2013-099750 filed in Japan on May 9, 2013.

BACKGROUND OF THE INVENTION

1. Field of the Invention

The present invention relates to a display control method, a display control device, and a display system.

2. Description of the Related Art

Increase in computer performance has made it possible to display computer graphics images using the three-dimensional coordinates (hereinafter, "3DCG") with ease in recent years. In the field of 3DCG, it is also widely practiced to display a motion picture by setting regular or random motion for each of objects arranged in a three-dimensional coordinate space. Such a motion picture can realize display as if the objects are independently moving in the three-dimensional coordinate space.

Japanese Patent No. 4161325 discloses a technique of displaying an image made by an animator by hand-drawing while adding motion thereto and combining therewith a background image prepared in advance, in an image using 3DCG.

There is a need for a technique that makes it possible to display user's image, which is made by a general user by hand-drawing, the user's image is moved in a more lifelike manner in 3DCG images with ease. According to the technique disclosed in Japanese Patent No. 4161325, what motion is to be added to an image is determined by an animator, and some experience is required to create lifelike motion. Accordingly, such a conventional technique is not sufficient to make it possible to display user's image, which is made by a general user by hand-drawing, such that the user's image is moved in a more lifelike manner.

Under the circumstances, there is a need to improve image processing technique to make it possible to display user's image, which is made by a general user by hand-drawing, such that the user's image is moved in a more lifelike manner.

SUMMARY OF THE INVENTION

It is an object of the present invention to at least partially solve the problems in the conventional technology.

A display control method includes: inputting user's image including a drawing portion made by hand drawing and being a display target image; and performing image control including causing the input user's image to emerge from any one of a left end and a right end of a predetermined display region, on which the user's image is to be displayed, and moving the user's image that has emerged.

A display control device includes: an input unit that inputs user's image including a drawing portion made by hand drawing and being a display target image; and an image control unit that causes the input user's image to emerge from any one of a left end and a right end of a predetermined display region, on which the user's image is to be displayed, and moves the user's image that has emerged.

A display system includes: an image input apparatus; an image processing apparatus; and at least one display apparatus. The image input apparatus includes an image input unit, through which an image including a drawing portion made by hand drawing and being a display target image is input. The display apparatus includes a display unit that displays an image. The image processing apparatus includes an input unit that inputs user's image including the drawing portion made by hand drawing and being a display target image, originating from the image input through the image input apparatus, and an image control unit that causes the input user's image to emerge from any one of a left end and a right end of a predetermined display region, on which the user's image is to be displayed, and moves the user's image that has emerged.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments are described in detail below with reference to the accompanying drawings.

First Embodiment

Figure 1:
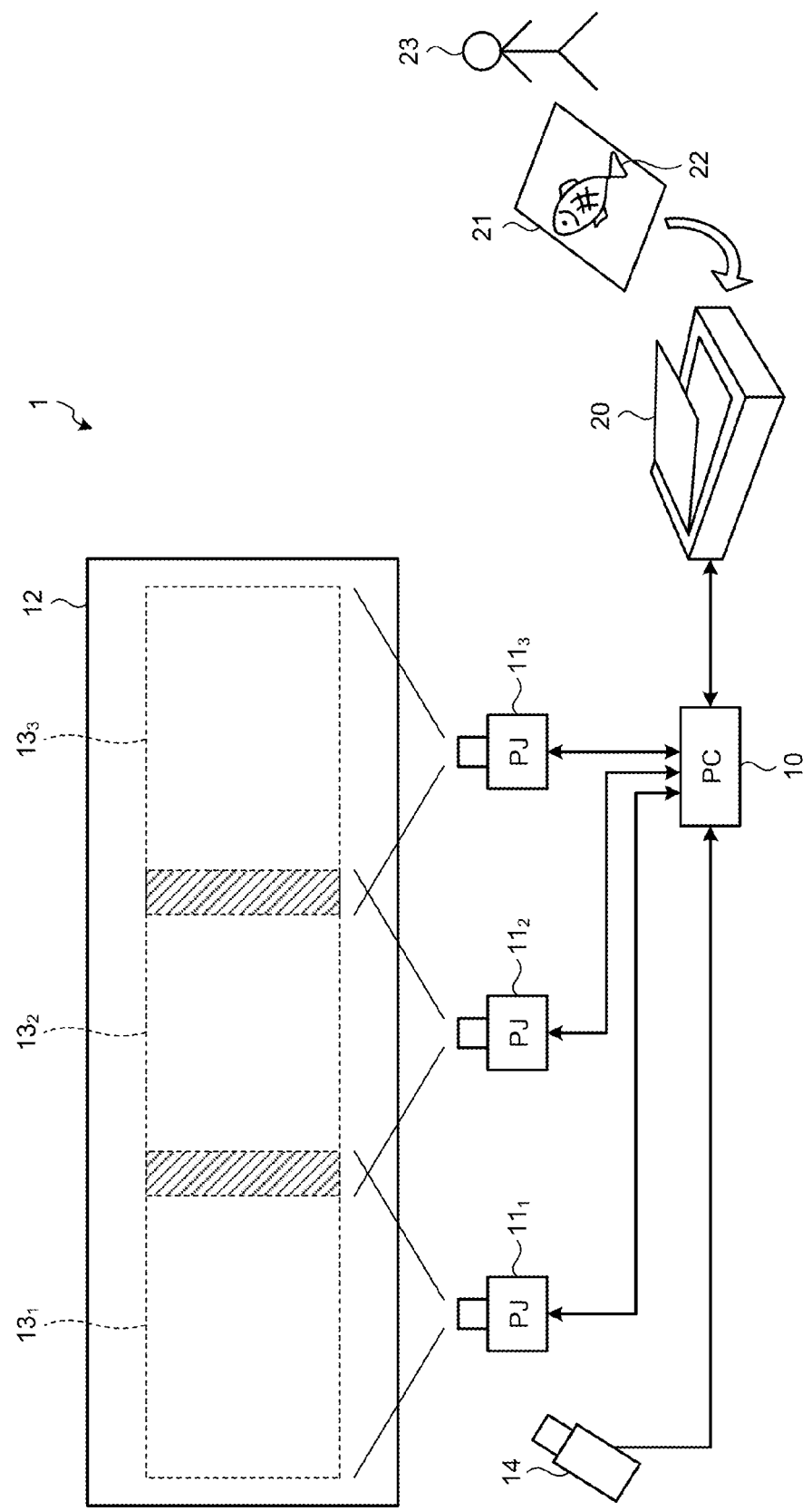
FIG. 1 is a block diagram illustrating an example configuration of a display system according to a first embodiment.

FIG. 1 is a block diagram illustrating an example configuration of a display system according to a first embodiment. Referring to FIG. 1, a display system 1 includes a personal computer (PC) 10, one or more projector apparatuses (PJs) $11_1$, $11_2$, and $11_3$, and a scanner apparatus 20. The PC 10 generates display image data by performing predetermined image processing on image data obtained by the scanner apparatus 20 by scanning an original document (hereinafter, "document") 21 and supplies the display image data to the PJs $11_1$, $11_2$, and $11_3$. The PJs $11_1$, $11_2$, and $11_3$ project respective images $13_1$, $13_2$, and $13_3$ onto a screen 12 according to the display image data fed from the PC 10.

Meanwhile, in a situation where the plurality of PJs $11_1$, $11_2$, and $11_3$ project the images $13_1$, $13_2$, and $13_3$ onto the screen 12 as illustrated in FIG. 1, it is preferable that adjacent portions of the images $13_1$, $13_2$, and $13_3$ overlap each other. In the example illustrated in FIG. 1, a camera 14 captures the images $13_1$, $13_2$, and $13_3$ projected on the screen 12. The PC 10 adjusts images of the overlapping portions by controlling the images $13_1$, $13_2$, and $13_3$ or the PJs $11_1$, $11_2$, and $11_3$ based on captured image data.

In the display system 1 configured as described above, an image of the document 21, on which a picture 22 is hand-drawn by a user 23, for example, is read by the scanner apparatus 20. The scanner apparatus 20 obtains document image data by scanning the image of the document 21 and supplies the document image data to the PC 10. The PC 10 extracts data representing the picture 22 from the document image data fed from the scanner apparatus 20, and holds the extracted image data as user's image data.

Meanwhile, the PC 10 generates image-data space with a three-dimensional coordinate system. The PC 10 assigns coordinates in the image-data space to user's image data, thereby incorporating the user's image data as data in the image-data space. Hereinafter, the user's image data in the three-dimensional image-data space is referred to as "user's object". The PC 10 generates image data by projecting the three-dimensional image-data space including the user's object onto a two-dimensional image-data plane. The PC 10 then divides the generated image data into a number of pieces as many as the number (in this embodiment, three) of the PJs $11_1$, $11_2$, and $11_3$, and supplies the divided image data to the PJs $11_1$, $11_2$, and $11_3$.

Note that the PC 10 is capable of adding motion in the image-data space to user's object in the following manner, for example. The PC 10 obtains feature values of user's image data, from which the user's object derives, and generates motion-related parameters including a deformation mode of the user's object. The PC 10 adds motion to the user's object in the image-data space by applying the parameters to the user's image data.

Adding motion in this manner allows the user 23 to view an image derived from the picture 22 hand-drawn by the user 23 himself/herself as moving in the three-dimensional image-data space. Furthermore, the PC 10 can include a plurality of user's objects in the same image-data space.

Accordingly, when the operation described above is repeatedly performed, the user 23 can view each of images derived from a plurality of the pictures 22, which may be different pictures, for example, as moving in the three-dimensional image-data space.

Figure 2:
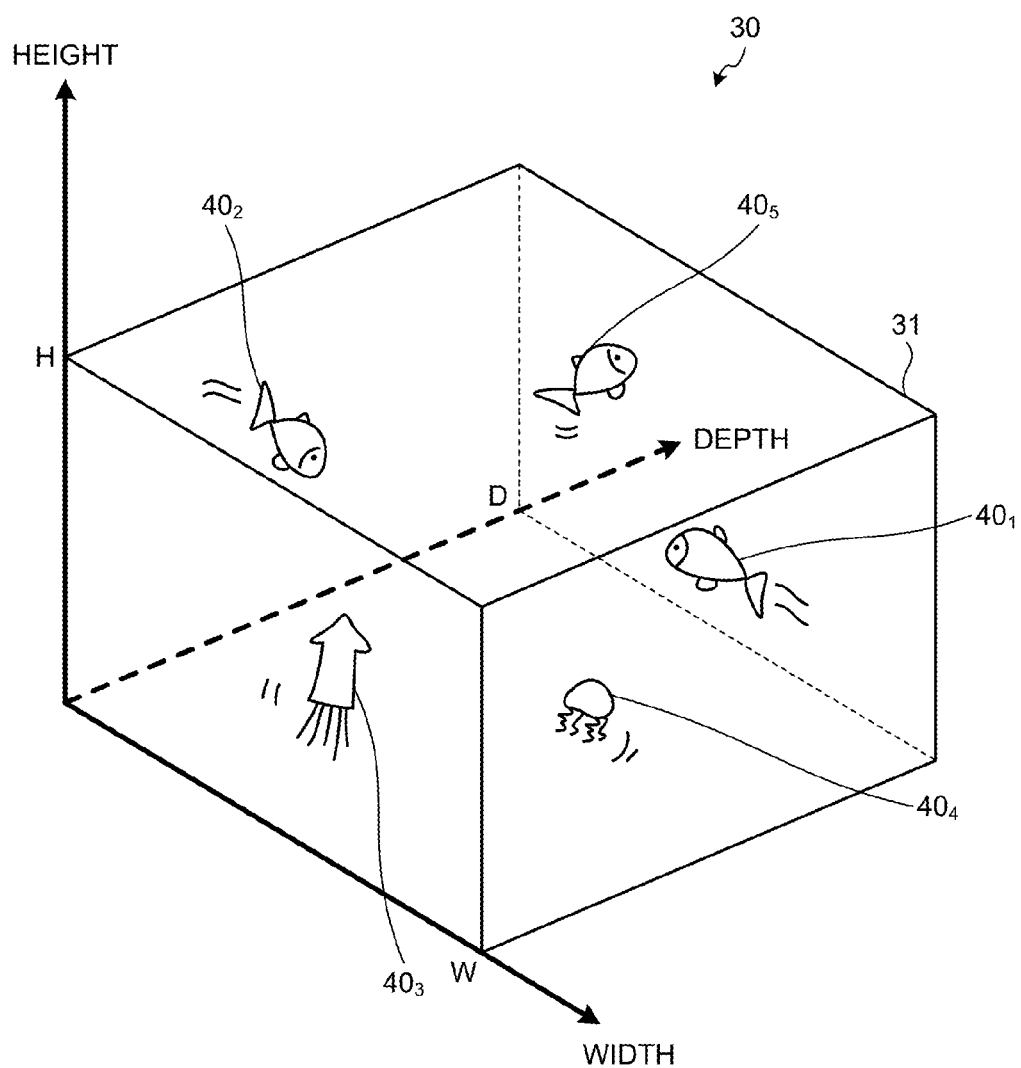
FIG. 2 is a diagram schematically illustrating image-data space with a three-dimensional coordinate system according to the embodiment.

FIG. 2 schematically illustrates image-data space, which is generated by the PC 10, with a three-dimensional coordinate system according to the embodiment. In the embodiment, the Cartesian coordinate system having three mutually-orthogonal coordinate axes (the x-axis, the y-axis, and the z-axis) is used as the three-dimensional coordinate system. Hereinafter, as illustrated in FIG. 2, it is assumed that the PC 10 generates image-data space 30 with a three-dimensional coordinate system in which the x-axis, the y-axis, and the z-axis are the height axis, the width axis, and the depth axis, respectively. In the example illustrated in FIG. 2, the image-data space 30 includes user's objects $40_1$, $40_2$, $40_3$, $40_4$, and $40_5$ derived from user's image data.

The PC 10 defines a defined region 31, which is a space defined by a height H, a width W, and a depth D having respective values determined in advance, in the image-data space 30. Motion of the user's objects $40_1$, $40_2$ ... derived from the user's image data are confined within the defined region 31. In the embodiment, it is assumed that the pictures 22, from which the user's objects $40_1$, $40_2$ ... derive, are creatures living in water such as fish, squids, octopuses, and jellyfish. The defined region 31 can be considered as a virtual aquarium. Hereinafter, unless otherwise specified, the defined region 31 is referred to as the virtual aquarium 31.

Figure 3:
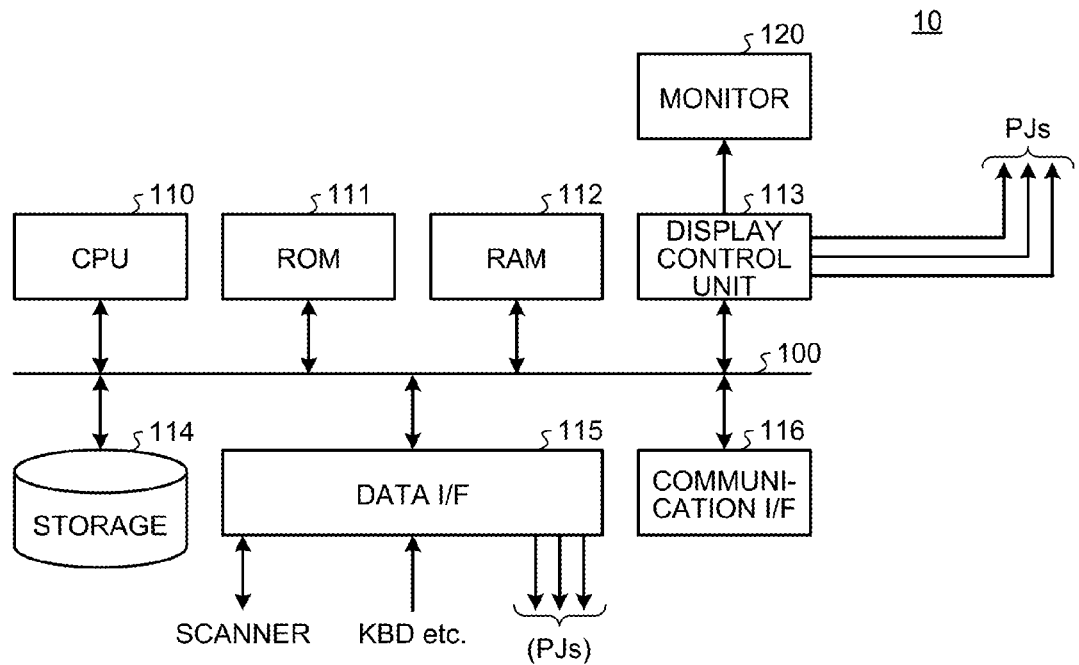
FIG. 3 is a block diagram illustrating an example configuration of a PC applicable to the embodiment.

FIG. 3 illustrates an example configuration of the PC 10 that is applicable to the embodiment. In the PC 10 illustrated in FIG. 3, a central processing unit (CPU) 110, a read only memory (ROM) 111, a random access memory (RAM) 112, and a display control unit 113 are connected to a bus 100. A storage 114, a data I/F 115, and a communication I/F 116 are also connected to the bus 100 in the PC 10.

The CPU 110 controls the entire PC 10 according to program stored in advance in the ROM 111 and the storage 114 by using the RAM 112 as a working memory. The display control unit 113, to which a monitor 120 is connected, converts a display control signal generated by the CPU 110 to a signal usable by the monitor 120 for displaying, and outputs the converted signal to the monitor 120. The display control unit 113 is also capable of converting the display control signal into signals usable by the projector apparatuses $11_1$, $11_2$, and $11_3$ for displaying, and outputting the signals to the PJs $11_1$, $11_2$, and $11_3$.

The storage 114 is a storage medium capable of nonvolatile storage of data and can be, for instance, a hard disk drive. Alternatively, a nonvolatile semiconductor memory, such as a flash memory, may be used as the storage 114. The storage 114 stores the program to be executed by the CPU 110 and various types of data.

The data I/F 115 controls data inputs and outputs from and to external equipment. For instance, the data I/F 115 is used as an interface between the PC 10 and the scanner apparatus 20. The data I/F 115 also receives signal input from a pointing device, such as a mouse, and a keyboard (KBD) (not shown). The display control signal generated by the CPU 110 may be output via the data I/F 115 to the projector apparatuses $11_2$, $11_2$, and $11_3$, for example. Universal serial bus (USB) interface, Bluetooth (registered trademark) interface, or the like interface can be used as the data I/F 115.

The communication I/F 116 controls communication over a network such as the Internet or a local area network (LAN).

Figure 4:
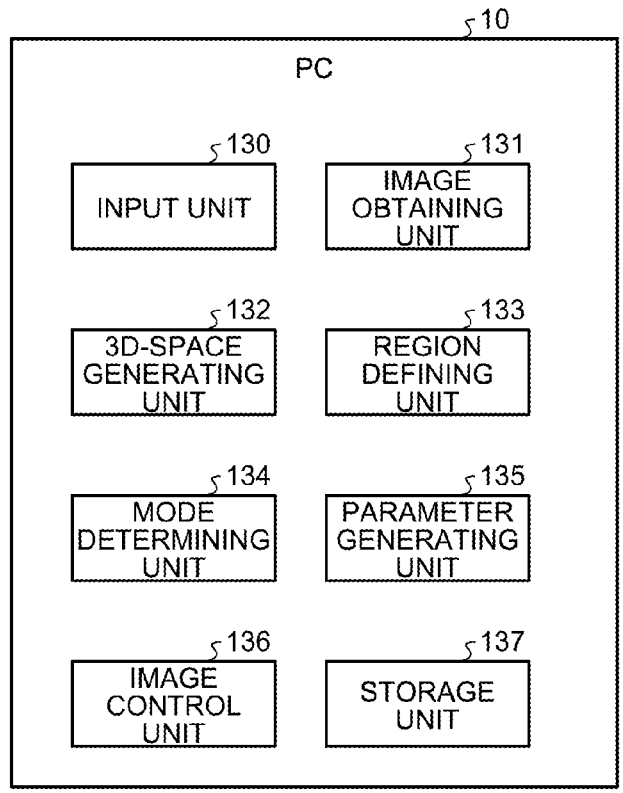
FIG. 4 is an example functional block diagram for describing functions of the PC according to the embodiment.

FIG. 4 is an example functional block diagram for describing functions of the PC 10 according to the embodiment. The PC 10 includes an input unit 130, an image obtaining unit 131, a 3D-space generating unit 132, a region defining unit 133, a mode determining unit 134, a parameter generating unit 135, an image control unit 136, and a storage unit 137.

The input unit 130 inputs an image including a drawing portion hand-drawn by the user 23. For instance, the input unit 130 may have a function of the data I/F 115 and input document image data obtained by the scanner apparatus 20 by scanning an image of the document 21 including the picture 22, which is the drawing portion hand-drawn by the user 23. The input unit 130 extracts, as user's image data, image data representing the picture 22 from the document image data.

The 3D-space generating unit 132 generates the image-data space 30 having the three-dimensional coordinate axes, which are the three axes: the height axis, the width axis, and the depth axis, described above with reference to FIG. 2. The 3D-space generating unit 132 generates the image-data space 30 as an address space in the RAM 112, for example. The region defining unit 133 defines the defined region 31 (the virtual aquarium 31) with the height H, the width W, and the depth D, which are the predetermined values, in the image-data space 30 generated by the 3D-space generating unit 132.

The image obtaining unit 131 sets a predetermined eye point with respect to the image-data space 30, projects the image-data space 30 onto a two-dimensional image-data plane from the set eye point, and obtains image data to be projected by the projector apparatuses $11_2$, $11_2$, and $11_3$.

The mode determining unit 134 determines a mode, which is to be assigned to the user's object derived from the user's image data when the user's image data is included in the image-data space 30, and based on which user's object is to be deformed (hereinafter, "deformation mode"), based on the user's image data obtained by the input unit 130. The parameter generating unit 135 generates motion-related parameters that determine motion-related properties of the user's object, based on the user's image data obtained by the input unit 130.

The image control unit 136 controls motion of the user's object in the image-data space 30 according to the deformation mode determined by the mode determining unit 134 and the parameters generated by the parameter generating unit 135. In other words, the image control unit 136 performs control of assigning coordinates in the virtual aquarium 31 in the image-data space 30 to the user's object and continuously changing the coordinates with lapse of time.

The storage unit 137 corresponds to the RAM 112 and stores user's image data, from which user's object derives, and the like. However, the storage unit 137 is not limited to the RAM 112, and the storage 114 may be used as the storage unit 137. For example, determination of the deformation mode by the mode determining unit 134 and generation of the parameters by the parameter generating unit 135 are performed by using the user's image data stored in the storage unit 137. The image control unit 136 is capable of incorporating the user's image data into the image-data space 30 as user's object by assigning coordinates in the virtual aquarium 31 to the user's image data stored in the storage unit 137. Furthermore, the image control unit 136 deforms and moves the user's object according to the deformation mode and the parameters.

The input unit 130, the image obtaining unit 131, the 3D-space generating unit 132, the region defining unit 133, the mode determining unit 134, the parameter generating unit 135, and the image control unit 136 included in the PC 10 may be implemented by a display control program that is stored in the storage 114 in advance and executed on the CPU 110, for instance. The display control program may be provided by being recorded as a file in an installable format or in an executable format in a computer-readable recording medium such as a compact disc (CD), a flexible disk (FD), or a digital versatile disk (DVD).

The display control program to be executed by the PC 10 of the embodiment may be configured to be provided by being stored in a computer connected to a network such as the Internet and downloaded over the network. The display control program to be executed by the PC 10 of the embodiment may be configured to be provided or distributed over a network such as the Internet. The display control program of the embodiment may be configured to be provided by being installed in the ROM 111 or the like in advance.

The display control program to be executed by the PC 10 of the embodiment has a module structure including the units (the input unit 130, the image obtaining unit 131, the 3D-space generating unit 132, the region defining unit 133, the mode determining unit 134, the parameter generating unit 135, and the image control unit 136) described above. From viewpoint of actual hardware, the CPU 110 reads out the display control program from a storage medium, e.g., the storage 114 or the ROM 111, and executes the program to load the units on a main storage device, e.g., the RAM 112, thereby generating the input unit 130, the image obtaining unit 131, the 3D-space generating unit 132, the region defining unit 133, the mode determining unit 134, the parameter generating unit 135, and the image control unit 136 on the main storage device.

Figure 5:
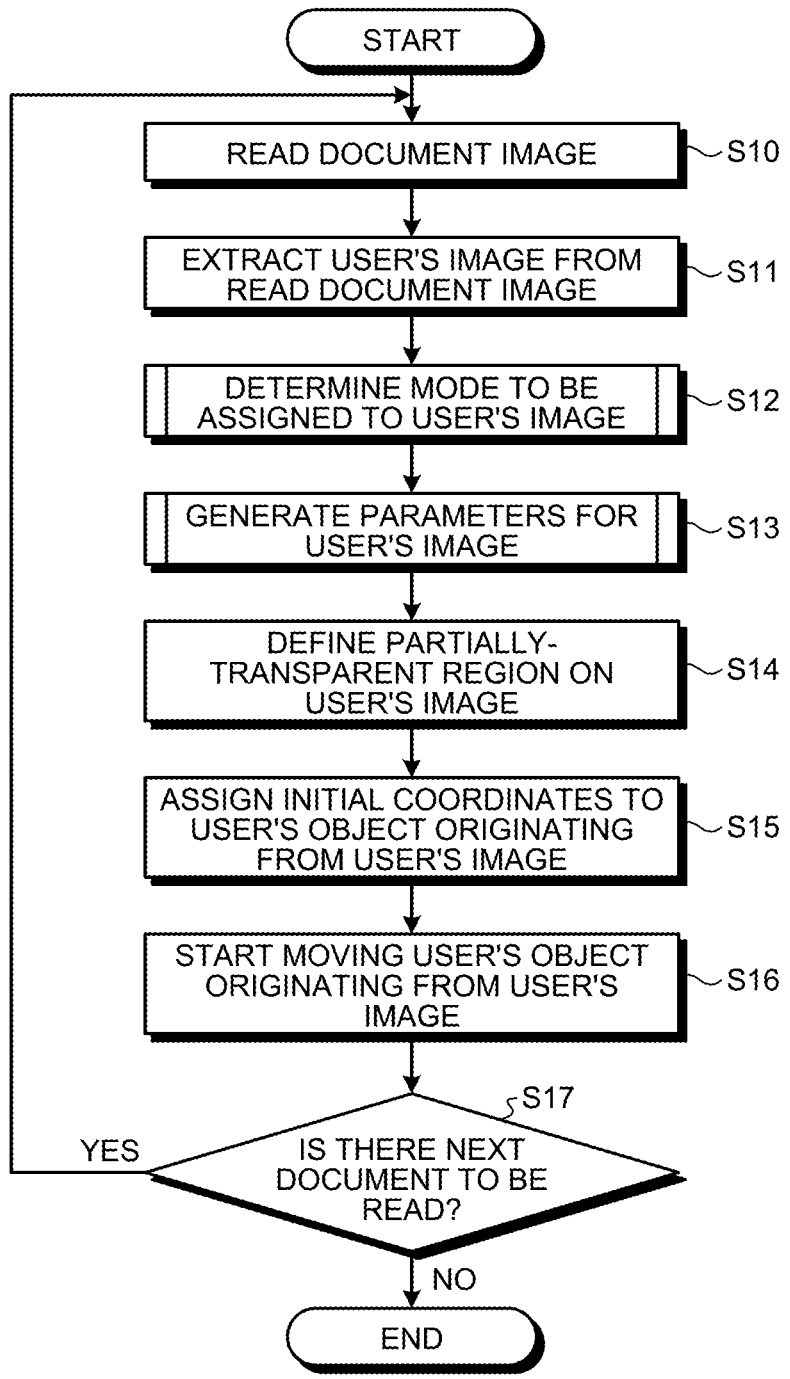
FIG. 5 is an example flowchart of a general procedure of a display control process according to the embodiment.

A display control process according to the embodiment is described in more detail below. FIG. 5 is an example flowchart of a general procedure of the display control process according to the embodiment. Prior to execution of the process of this flowchart, a hand-drawn picture is made by a user. It is assumed in this example that a user hand-draws a picture on a sheet of a predetermined format.

Figure 6:
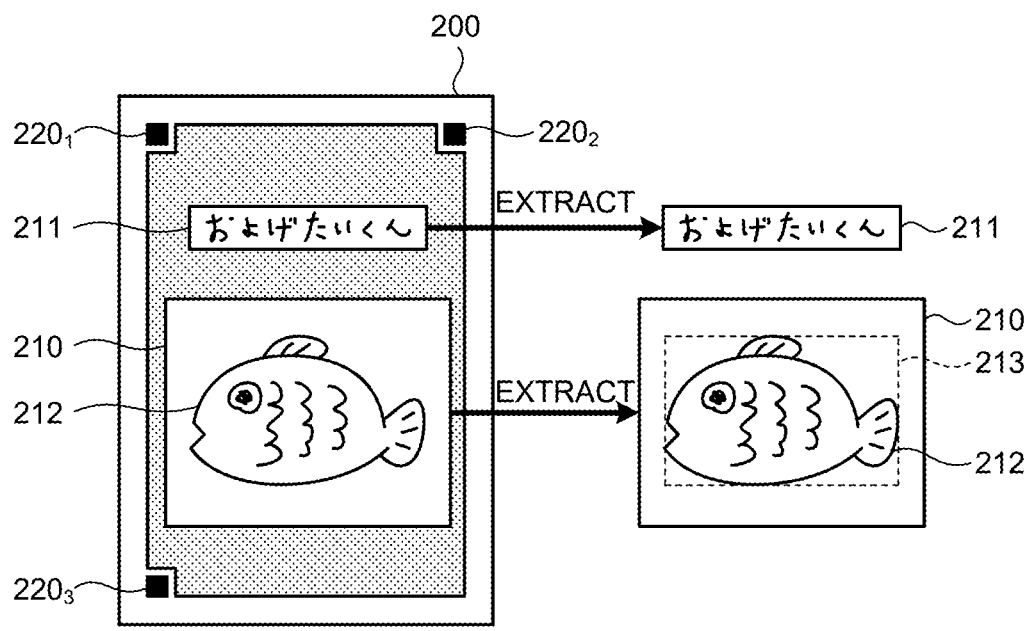
FIG. 6 is a diagram illustrating an example of a sheet on which a drawing is to be hand-drawn according to the embodiment.

FIG. 6 illustrates an example of a sheet on which a picture is to be hand-drawn according to the embodiment. A drawing region 210 and a title text region 211 are arranged on a sheet 200 illustrated on the left of FIG. 6. A picture 212, from which an object (user's object) to be incorporated in the image-data space 30 is to be derived, is to be hand-drawn in the drawing region 210. A title of the picture drawn in the drawing region 210 is to be written in the title text region 211.

Marks $220_1$, $220_2$, and $220_3$ are arranged on three corners of the four corners of the sheet 200. Orientation and size of the sheet 200 can be obtained by detecting the marks $220_2$, $220_2$, and $220_3$ from a document image, which is obtained by the scanner apparatus 20 by scanning an image of the sheet 200.

In Step S10 of the flowchart illustrated in FIG. 5, the scanner apparatus 20 scans an image of the sheet 200, on which the picture 212 is hand-drawn by a user, and supplies the document image data originating from the scanned image to the PC 10, in which the document image data is input to the input unit 130.

In next Step S11, the input unit 130 of the PC 10 extracts user's image data from the input document image data. More specifically, the input unit 130 detects the marks $220_2$, $220_2$, and $220_3$ from the document image data. The input unit 130 determines orientation and size of the document image data based on locations of the marks $220_1$, $220_2$, and $220_3$ on the document image data.

For example, the input unit 130 may find a markerless corner, which is one of the four corners of the document image data and at which none of the marks $220_1$, $220_2$, and $220_3$ is detected, and determines the orientation of the document image data based on the location of the markerless corner. In the example illustrated in FIG. 6, the input unit 130 determines that the markerless corner, at which none of the marks $220_1$, $220_2$, and $220_3$ is detected, is the bottom right corner of the document image data. Based on this, the locations of the marks $220_1$, $220_2$, and $220_3$ on the document image data may be determined. Furthermore, the input unit 130 measures distances between the respective marks $220_1$, $220_2$, and $220_3$, and compares the distances against known corresponding distances stored in the storage 114 or the like in advance. Warping in vertical and horizontal size of the document image data can be corrected based on a result of this comparison.

The input unit 130 extracts the drawing region 210 and the title text region 211 from the document image data based on the orientation and the size of the document image data obtained as described above. An example of an image represented by the image data of the drawing region 210 and that of the title text region 211 extracted from the document image data are illustrated on the right of FIG. 6. The input unit 130 further extracts the picture 212 from the image data representing the drawing region 210. For example, the input unit 130 may extract the picture 212 by determining whether each pixel constituting the image data representing the drawing region 210 is white (which is the background color of the sheet 200) or other-than-white. The input unit 130 determines image data in a minimum rectangular region 213 including the picture 212 and having a lower side parallel to the lower side of the drawing region 210 as user's image data. The input unit 130 stores the user's image data in the storage unit 137.

In next Step S12, the mode determining unit 134 of the PC 10 determines a deformation mode to be assigned to the user's image data extracted in Step S11. In the embodiment, a deformation mode is assigned to each of user's objects in the virtual aquarium 31. Motion of the each user's object in the virtual aquarium 31 is controlled based on the deformation mode.

In the embodiment, three deformation modes are defined. The three modes are: a first mode in which user's object is deformed such that a trailing one (with respect to a moving direction in which the user's object moves) of two parts, into which the user's object is vertically divided, is moved; a second mode in which the user's object is deformed such that the user's object is vertically extended and contracted the object; and a third mode in which the user's object is deformed such that a lower one of two parts, into which the user's object is horizontally divided, is moved. In the embodiment, an aspect ratio R of the user's image data is obtained. Which one of the first, second, and third modes is to be assigned to the user's object originating from the user's image data is determined according to the aspect ratio R.

Figure 7:
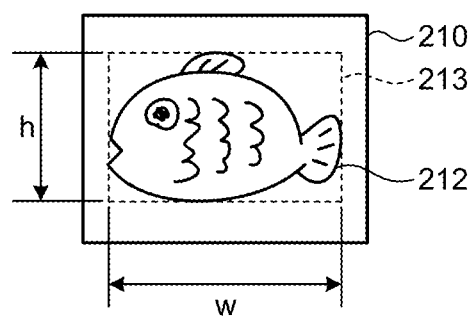
FIG. 7 is a diagram for describing an aspect ratio R of user's image data according to the embodiment.

The aspect ratio R of user's image data according to the embodiment is described below with reference to FIG. 7. The rectangular region 213 illustrated in FIG. 7 is a minimum region including a portion of the picture 212 (which is, for example, a portion where pixel values are other-than-white) in the drawing region 210 and having the lower side parallel to the lower side of the drawing region 210 as described above. The aspect ratio R is expressed by Equation (1) below using a height h and a width w of the rectangular region 213. Equation (1) indicates that the larger the aspect ratio R is, the more vertically elongated the rectangular region 213 is.

$$R=h/w \tag{1}$$

In this example, the direction extending through the marks $220_1$ and $220_3$ is the vertical direction of the rectangular region 213; the direction extending through the marks $220_2$ and $220_2$ is the horizontal direction of the rectangular region 213.

Figure 8:
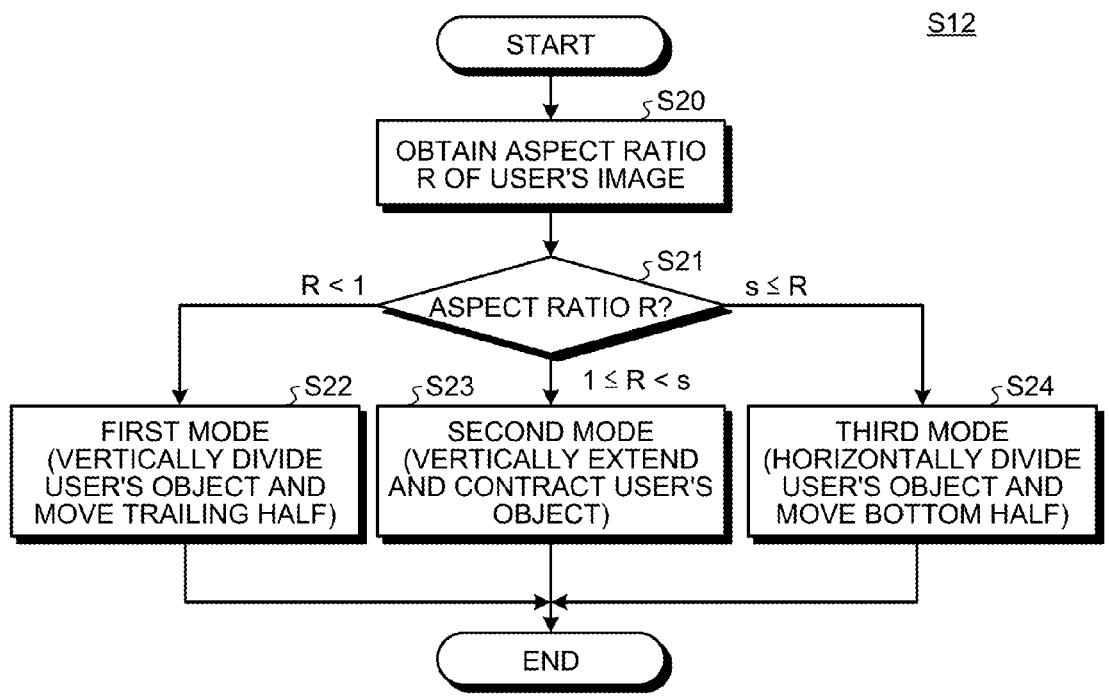
FIG. 8 is a flowchart of a procedure of a deformation-mode determining process to be performed by a mode determining unit according to the embodiment.

FIG. 8 is a flowchart of a procedure of a deformation-mode determining process to be performed by the mode determining unit 134 in Step S12. The mode determining unit 134 obtains the aspect ratio R of the user's image data in Step S20 as described above. The mode determining unit 134 makes determination about the value of the aspect ratio R in Step S21. More specifically, in the embodiment, the mode determining unit 134 determines to which one of a range smaller than 1, a range from equal to or larger than 1 to smaller than a predetermined value s, and a range equal to or larger than the predetermined value s the aspect ratio R belongs. In the embodiment, the deformation mode is assigned to the user's object originating from the user's image data according to the aspect ratio R.

If the mode determining unit 134 determines that the aspect ratio R is smaller than 1 in Step S21, the process proceeds to Step S22, in which the mode determining unit 134 assigns the first mode to the object originating from the user's image data.

Figure 9:
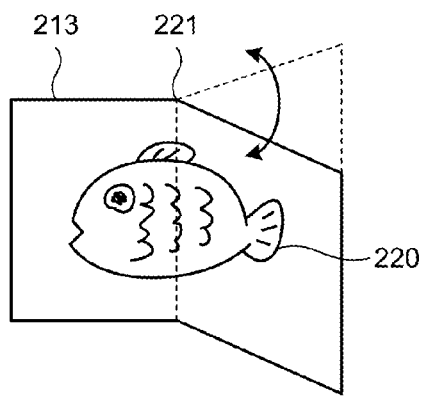
FIG. 9 is a diagram for describing motion of a first mode according to the embodiment.
Figure 10:
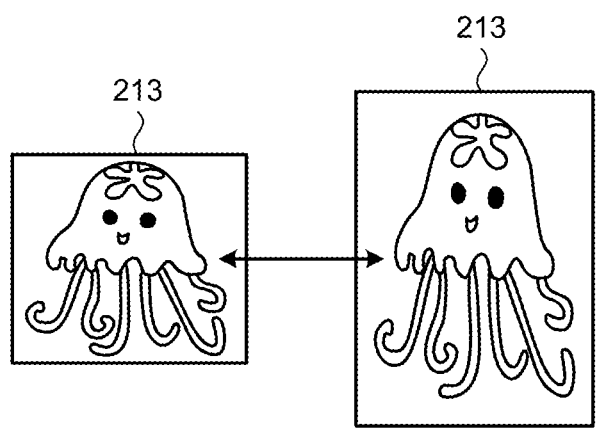
FIG. 10 is a diagram for describing motion of a second mode according to the embodiment.
Figure 11:
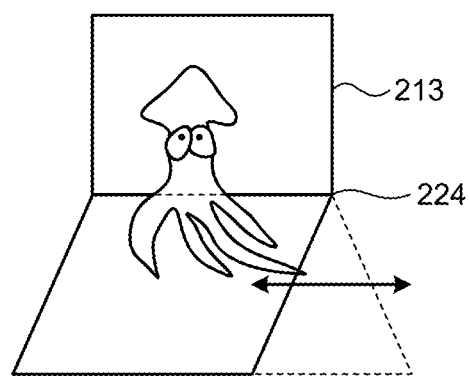
FIG. 11 is a diagram for describing motion of a third mode according to the embodiment.

Motion of the first mode according to the embodiment is described below with reference to FIG. 9. In FIG. 9, and FIGS. 10 and 11, which will be referenced later, the rectangular region 213 is described to be larger relative to the picture 212 for clarity.

As illustrated in FIG. 9, the first mode is a mode in which an image of the rectangular region 213 represented by the user's image data is deformed in the following manner. The image is vertically divided at a dividing line 221 which may be, for example, at a center of the image. One (hereinafter, referred to as "moving part") of two parts, into which the image is divided, is continuously moved or, more specifically, moved continuously with lapse of time. The first mode is meant for creating a typical motion of fish or the like.

In the first mode, the moving part is defined so as to swing in a front and back direction on the dividing line 221 within a predetermined angular range. That is, when the rectangular region 213 is in the image-data space 30, the moving part is moved such that the moving part pivots about the dividing line 221 within the predetermined angular range in a plane, which is orthogonal to a plane where the rectangular region 213 initially resides and to the dividing line 221.

In the first mode, the moving part is preferably a trailing part with respect to the moving direction of the user's object, so that appearance of motion similar to a swimming motion of fish can be created. To set a trailing part with respect to the moving direction as the moving part, a scheme of specifying the orientation of the picture 212 hand-drawn on the drawing region 210 of the sheet 200 in advance can be employed, for example. However, an applicable scheme is not limited thereto. Alternatively, for example, a mark indicating the moving direction may be embedded in the picture 212. In the example illustrated in FIG. 6, the eye is drawn in black, and black is not used in other portions than the eye. Accordingly, the orientation of the picture 212 can be determined by detecting a black portion from the picture 212.

If the mode determining unit 134 determines that the aspect ratio R is equal to or larger than 1 and smaller than the predetermined value s in Step S21, the process proceeds to Step S23, in which the mode determining unit 134 assigns the second mode to the object originating from the user's image data. The second mode according to the embodiment is described below with reference to FIG. 10. As illustrated in FIG. 10, in the second mode, the image of the rectangular region 213 represented by the user's image data is deformed such that the image is continuously vertically extended and contracted. The image may be extended and contracted at predetermined intervals, for example. The second mode is meant for creating motion of a creature, such as jellyfish, orientation of which is obscure and which is less active.

A value which will cause an extended image and a contracted image to appear natural is to be employed as the predetermined value s, which is a criterion for determining the second mode and the third mode described later. A value which will not cause a vertically extended image to appear to be excessively elongated and will not cause a vertically contracted image to appear to be excessively flattened may preferably be experimentally obtained as the predetermined value s, for example. As such a value, a value equal to or larger than 1 and smaller than 2; e.g., 1.5., is conceivable If the mode determining unit 134 determines that the aspect ratio R is larger than the predetermined value s in Step S21, the process proceeds to Step S24, in which the mode determining unit 134 assigns the third mode to the object originating from the user's image data.

The third mode according to the embodiment is described below with reference to FIG. 11. As illustrated in FIG. 11, the third mode is a mode in which the image of the rectangular region 213 represented by the user's image data is deformed in the following manner. The image is horizontally divided at a dividing line 224 which may be, for example, at a center of the image. One of two parts, into which the image is divided, is moved as a moving part. The third mode is meant for creating motion of a creature, such as a squid or an octopus, which is usually represented in a vertically elongated form. In the third mode, the height of the moving part is kept constant, and an upper side of the moving part is made be the dividing line 224, and a lower side of the moving part is continuously moved in a left and right direction. More specifically, in the third mode, the moving part moves on the plane of the rectangular region 213 while keeping its parallelogram shape, which is constant in height and the upper side of which is the dividing line 224.

When one of the deformation modes is assigned in any one of Steps S22 to S24, the process proceeds to Step S13 of FIG. 5.

Referring back to FIG. 5, the parameter generating unit 135 of the PC 10 generates and determines parameters p that determine properties (hereinafter, "motion properties") related to motion of user's object originating from the user's image data in the image-data space 30 for the user's object in Step S13. The motion of the user's object in the image-data space 30 is controlled according to the parameters p generated and determined here.

The parameters p to be determined in the embodiment are described below. In the embodiment, the parameter generating unit 135 determines parameters $p_0$ to $p_8$, which are the following nine types of motion properties, on a per-user's-object basis.

(1) $p_0$: maximum moving-direction velocity $v_{max}$
(2) $p_1$: moving-direction acceleration a
(3) $p_2$: maximum angular acceleration $\alpha h_{max}$ in horizontal plane
(4) $p_3$: maximum angular acceleration $\alpha v_{max}$ in vertical plane
(5) $p_4$: maximum value (hereinafter, "maximum changing rate") $vd_{max}$ of changing rate of orientation in vertical plane
(6) $p_5$: maximum value of random number (hereinafter, "maximum random number") $dRu_{max}$ for upward angle
(7) $p_6$: maximum random number $dRd_{max}$ for downward angle
(8) $p_7$: maximum random number $dRr_{max}$ for rightward angle
(9) $p_8$: maximum random number $dRl_{max}$ for leftward angle Of these parameters, the parameter $p_0$, the maximum moving-direction velocity $v_{max}$, and $p_1$, the moving-direction acceleration a, are parameters for controlling the moving-direction velocity of the user's object in the image-data space 30. The parameter $p_2$, the maximum angular acceleration $\alpha h_{max}$ in the horizontal plane, and $p_3$, the maximum angular acceleration $\alpha v_{max}$ in the vertical plane, are parameters for rotating the user's object in the horizontal plane and the vertical plane, respectively.

The parameter $p_4$, the maximum changing rate $vd_{max}$ of orientation in the vertical plane, is a parameter for providing the maximum value of the changing rate when the moving velocity of the user's object in the vertical direction is to be changed. More specifically, in the embodiment, vertical motion of the user's object is confined within the virtual aquarium 31 by reversing a vertical component of the moving direction when the user's objects contacts a top end surface (ceiling) or a bottom end surface (floor) of the virtual aquarium 31. The parameter $p_4$ provides the maximum value of the angular reversal velocity at which the vertical component of the moving direction is to be reversed.

The parameters $p_5$ and $p_6$, the maximum random number $dRu_{max}$ for upward direction and the maximum random number $dRd_{max}$ for downward direction, are parameters for setting a bound to angular acceleration of a rotating motion of the user's object in the vertical direction or, in other words, upward or downward to the moving direction. Angular acceleration given by the parameters $p_5$ and $p_6$ is limited by the parameter $p_3$, the angular acceleration $\alpha v_{max}$ in the vertical plane.

The parameters $p_7$ and $p_8$, the maximum random number $dRr_{max}$ for rightward direction and the maximum random number $dRl_{max}$ for leftward direction, are parameters for setting a bound to angular acceleration of a rotating motion of the user's object in the horizontal direction or, more specifically, rightward or leftward to the moving direction.

Figures 12, 13:
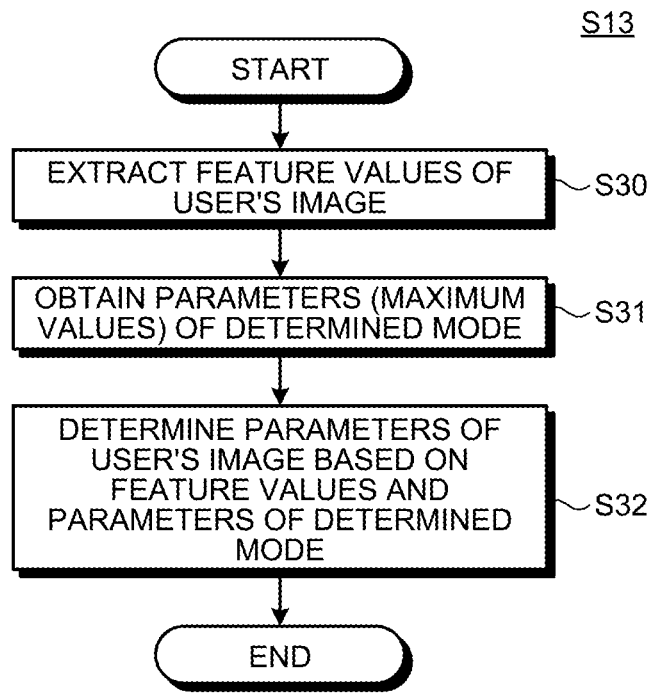
FIG. 12 is a flowchart of an example procedure of a parameter-generating-and-determining process to be performed by a parameter generating unit according to the embodiment.
FIG. 13 is a diagram illustrating an example of a method for determining parameters p using feature values c and maximum values m according to the embodiment.

FIG. 12 is a flowchart of an example procedure of a parameter-generating-and-determining process to be performed by the parameter generating unit 135 in Step S13. The parameter generating unit 135 extracts feature values $c_0$ to $c_8$ of the user's image data corresponding to the respective parameters $p_0$ to $p_8$ in Step S30. The parameter generating unit 135 obtains maximum values $m_1$ to $m_3$ of each of the parameters $p_0$ to $p_8$ for each of the deformation modes or, more specifically, for each of the first, second, and third modes in Step S31. In next Step S32, the parameter generating unit 135 determines the parameters $p_0$ to $p_8$ of the user's object originating from the user's image data by using the feature values $c_0$ to $c_8$ extracted in Step S30 and the maximum values $m_1$ to $m_3$ for the respective parameters $p_0$ to $p_8$ obtained in Step S31.

A method for obtaining the feature values $c_0$ to $c_8$ from the user's image data to be performed in Step S30 of FIG. 12 is described below. Feature values of an image can be obtained based on color distribution, edge level, or the like of user's image data. As described in Japanese Laid-open Patent Application No. 2009-101122, feature values may be obtained based on bit information of each pixel constituting user's image data. In the embodiment, the feature values are obtained using the method described in Japanese Laid-open Patent Application No. 2009-101122.

The feature value obtaining method described in Japanese Laid-open Patent Application No. 2009-101122 is briefly described below. The parameter generating unit 135 repeatedly and sequentially extracts n-bit (n is a predetermined positive integer) data, i.e., predetermined-bit strings, from user's image data stored in the storage unit 137. For example, if n is 8, the parameter generating unit 135 repeatedly and sequentially extracts 8-bit data from the user's image data until the terminal end of the user's image data. Hereinafter, the n-bit strings extracted from the user's image data are referred to as extracted data.

The parameter generating unit 135 classifies the extracted data into the parameters $p_0$ to $p_8$ described above in accordance with a preset classification rule. The classification rule provides, for example, data ranges associated with the respective parameters $p_0$ to $p_8$ for classifying the extracted data into the parameters $p_0$ to $p_8$.

An example of generating the feature values $c_0$ to $c_2$ corresponding to the respective three types of parameters $p_0$ to $p_2$ is described below. In this example, because data is extracted in units of 8 bits, a classification rule for classifying data in a range of data "h00 to hFF" in the two-digit hexadecimal number notation (the prefix letter "h" indicates that digits following "h" are in the hexadecimal notation) into the following three ranges of data is stored in the storage unit 137. According to this rule, a range of data "h00 to h6F" is classified into the "parameter $p_0$"; a range of data "h70 to h9F" is classified into the "parameter $p_1$"; a range of data "hA0 to hFF" is classified into the "parameter $p_2$".

The parameter generating unit 135 classifies the extracted data extracted from the user's image data in accordance with the ranges of data, which is preset as the classification rule. For example, when the extracted data is "b01101100" (the prefix letter "b" indicates that digits following "b" are in the binary notation), this eight-digit binary number is converted to "h6C" in the two-digit hexadecimal notation. Accordingly, when the extracted data is "b01101100", the extracted data is classified into the parameter $p_0$ to which the range of data "h00 to h6F" is allocated. When the extracted data is "b00110100", which is "h34" in the two-digit hexadecimal notation, this value "b00110100" is also classified into the parameter $p_0$.

Furthermore, when classifying the extracted data, the parameter generating unit 135 calculates, for each of the parameters $p_0$ to $p_8$, an extraction count (extraction frequency) of how many times extracted data is classified into the parameter. For example, in the example described above, extracted data is classified into the parameter $p_0$ two times ("b01101100" and "b00110100"); accordingly, the extraction count is "2". This extraction count is used as the feature value $c_0$ corresponding to the parameter $p_0$.

In Step S31 of FIG. 12, the parameter generating unit 135 obtains the maximum values m, which have been set in advance for each of the parameters $p_0$ to $p_8$ on a per-deformation-mode basis. The maximum values m, which have been set on the per-deformation-mode basis for each of the respective parameters $p_0$ to $p_8$, are stored in a nonvolatile storage medium such as the storage 114 in advance. The parameter generating unit 135 obtains the maximum values m by reading them from the nonvolatile storage medium in Step S31.

In Step S32 of FIG. 12, the parameter generating unit 135 determines the parameters $p_0$ to $p_8$ by using the feature values $c_0$ to $c_8$ obtained in Step S30 and the maximum values m obtained in Step S31. FIG. 13 illustrates an example of a method for determining the parameters $p_0$ to $p_8$ using the feature values $c_0$ to $c_8$ and the maximum values m according to the embodiment. Note that only the parameters $p_0$ to $p_2$ of the parameters $p_0$ to $p_8$ are illustrated in FIG. 13 for clarity.

In FIG. 13, the suffix letter "x" added to the maximum value $m_{xy}$ indicates the parameters $p_0$ to $p_8$; the suffix letter "y" indicates the first to third mode. More specifically, maximum values $m_{01}$, $m_{02}$, and $m_{03}$ for the first, second, and third modes, respectively, are set for the parameter $p_0$ in advance. Similarly, maximum values m $m_{12}$, and $m_{13}$ for the first, second, and third modes, respectively, are set for the parameter $p_1$ in advance. In this example, each of the maximum values $m_{xy}$ is a value larger than 0 and equal to or smaller than 1.

As illustrated in FIG. 13, in the embodiment, the parameters $p_0$ to $p_8$ are determined by multiplying the feature values $c_0$ to $c_8$ by the maximum values $m_{xy}$, which vary on the per-deformation-mode basis of the first to third modes and on the per-parameter basis of the parameters $p_0$ to $p_8$. More specifically, the parameter $p_0$ that provides the maximum moving-direction velocity of the first mode is determined as $p_0=m_{01} \times c_0$; that of the second mode is determined as $p_0=m_{02} \times c_0$; and that of the third mode is determined as $p_0=m_{03} \times c_0$. Similarly, the parameter $p_1$ that provides the moving-direction acceleration of the first mode is determined as $p_1=m_{11} \times c_1$; that of the second mode is determined as $p_1=m_{12} \times c_1$; and that of the third mode is determined as $p_1=m_{13} \times c_1$. The parameter $p_2$ can be determined in a similar manner.

The parameter generating unit 135 stores the parameters $p_0$ to $p_8$ determined in this manner in the storage unit 137.

Referring back to the flowchart of FIG. 5, when the parameter generating unit 135 has determined the parameters $p_0$ to $p_8$ in Step S13, the process proceeds to Step S14. In Step S14, the image control unit 136 defines a partially-transparent region for the user's image data. For example, the image control unit 136 detects an inner region and an outer region of the part of the picture 212 extracted by the input unit 130 from the rectangular region 213 including the user's image data as described above with reference to FIG. 6. The image control unit 136 sets white pixels in the detected inner region to be partially-transparent. The image control unit 136 sets the detected outer region to be transparent. Image data can be set to be partially-transparent or transparent by using a known alpha-blending technique.

Defining a partially-transparent region on the part of the picture 212 represented by the user's image data in this manner makes the user's object originating from the user's image data appear more water-creature-like in the virtual aquarium 31.

In next Step S15, the image control unit 136 assigns, to the user's object, initial coordinates, at which the user's object originating from the user's image data is to be displayed in the virtual aquarium 31 for the first time. Hereinafter, unless otherwise specified, displaying user's object in the virtual aquarium 31 for the first time is described as "the user's object emerges".

Projection of the image-data space 30 by the image obtaining unit 131 according to the embodiment is described below with reference to FIGS. 14A and 14B. To display the image-data space 30 having the three-dimensional coordinate axes on a display or a screen, it is necessary to project the image-data space 30 from a predetermined eye point to a two-dimensional plane. In the embodiment, the virtual aquarium 31 is projected because motion of the user's objects is confined within the virtual aquarium 31 in the image-data space 30.

Figure 14A:
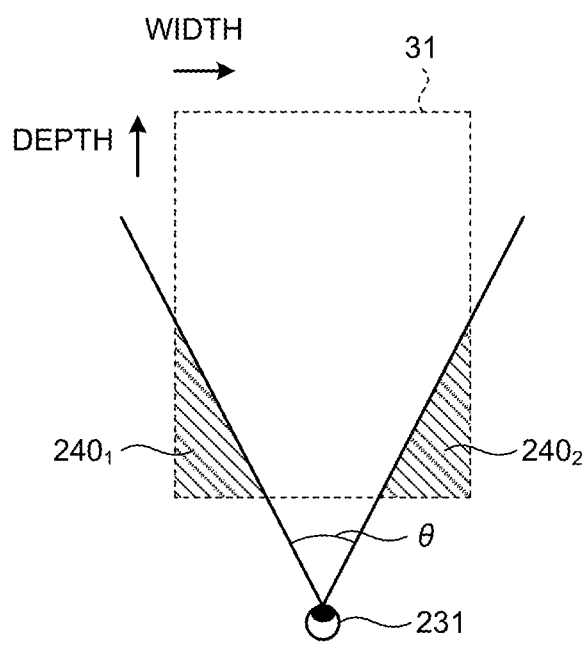
FIGS. 14A and 14B are diagrams for describing projection of image-data space according to the embodiment.

In FIG. 14A, the depth and the width in the image-data space 30 are depicted as the vertical direction and the horizontal direction, respectively. In the embodiment, the image obtaining unit 131 projects the virtual aquarium 31 onto a plane containing the height H and the width W along the depth direction of the virtual aquarium 31 from an eye point 231, which is located outside the virtual aquarium 31, with an angular field of view θ as illustrated in FIG. 14A. In the embodiment, projection is performed by perspective projection. The position of the eye point 231 and the angular field of view θ are set so as to form at least one of a left dead zone $240_1$ and a right dead zone $240_2$, each of which is a dead angle zone that is in a dead angle with respect to the eye point 231, in the virtual aquarium 31.

Figure 14B:
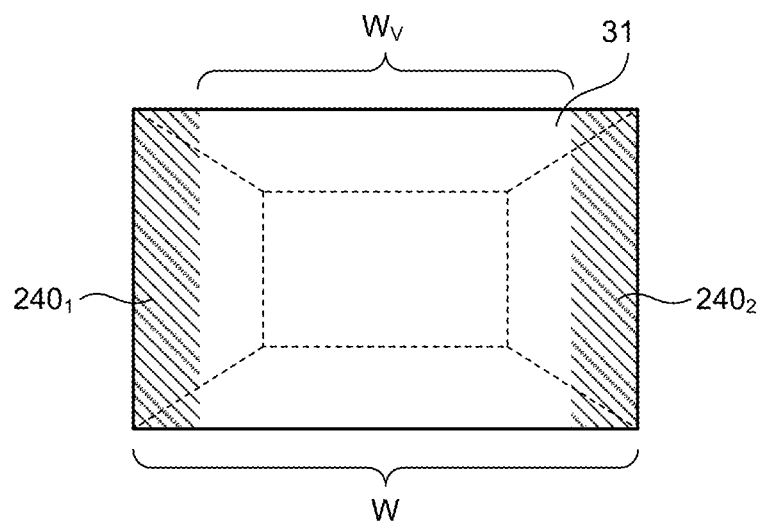

For example, in a case where the left dead zone $240_1$ and the right dead zone $240_2$ are formed on the left and the right with respect to the eye point 231, a region of width $W_v$, that is obtained by excluding the left dead zone $240_1$ and the right dead zone $240_2$ among from the plane with the height H and the width W of the virtual aquarium 31, is projected as illustrated in FIG. 14B. More specifically, although image data representing the portions of the left dead zone $240_1$ and the right dead zone $240_2$ in the virtual aquarium 31 is provided, the portions are not displayed on a projection image (displayed area) projected onto the two-dimensional plane. In other words, images of the left dead zone $240_1$ and the right dead zone $240_2$ are not visible in the image of the virtual aquarium 31 projected onto the two-dimensional plane.

In the embodiment, the image control unit 136 sets the initial coordinates when the user's object emerges into the virtual aquarium 31, to within the dead zone $240_1$ or $240_2$. The user's object, to which the initial coordinates in the dead zone $240_1$ or $240_2$ are assigned, is controlled by the image control unit 136 to move to enter the region of the width $W_v$ from the dead zone $240_1$ or $240_2$. Accordingly, when user's object is newly created, the new user's object appears to move such that the new user's object emerges from an end (the left end or the right end) of the projection image. Consequently, an unnatural impression, which would otherwise be given if the new user's object emerges at a portion in the projected image where the object was not at all displayed, can be avoided.

When projection is performed by perspective projection, user's object is projected such that the size of the user's object in the virtual aquarium 31 is maximized when the user's object is on the near side or, more specifically, at a position closest to the eye point 231, and gradually decreases when the user's object moves in the depth direction. Because the dead zones $240_1$ and $240_2$ are on the near side in the depth direction, the newly-created user's image is projected as a large image. Accordingly, the newly-created user's image is more likely to be noticed.

In next Step S16, the image control unit 136 adds motion to the user's object to which the initial coordinates are assigned in Step S15 and causes the user's object to start moving.

In next Step S17, the PC 10 determines whether or not a next document image is to be read. If the PC 10 determines that a next document image is to be read, the process is returned to Step S10. On the other hand, if the PC 10 determines that a next document image is not to be read, the PC 10 completes the sequence of processing of the flowchart illustrated in FIG. 5. Determination that a document image is not to be read can be made based on, for example, whether or not the scanner apparatus 20 is disconnected from the PC 10 or whether or not a predetermined period of time has elapsed since reading is performed last.

Figure 15:
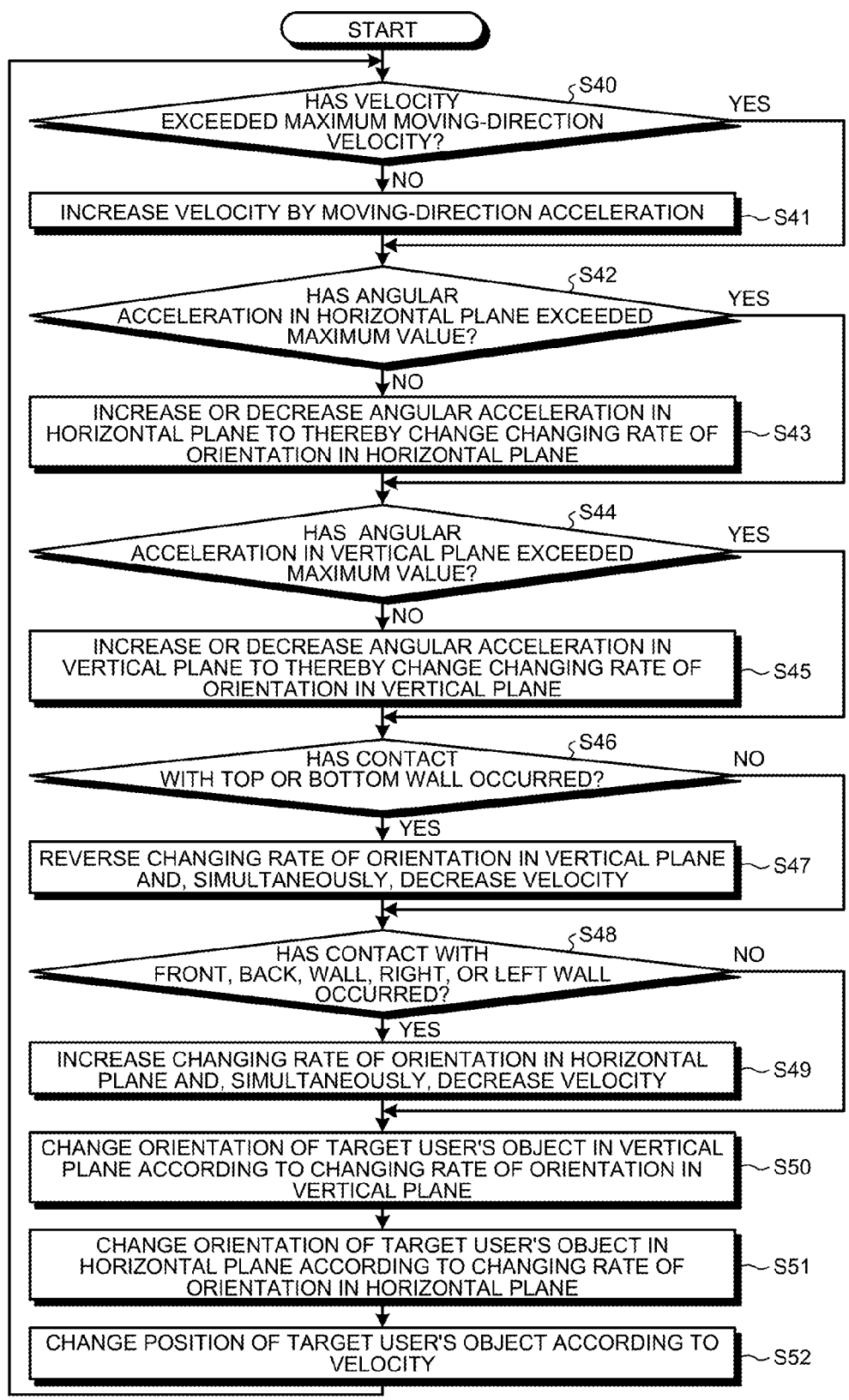
FIG. 15 is a flowchart of an example procedure of controlling motion of target user's object by an image control unit according to the embodiment.
Figure 16:
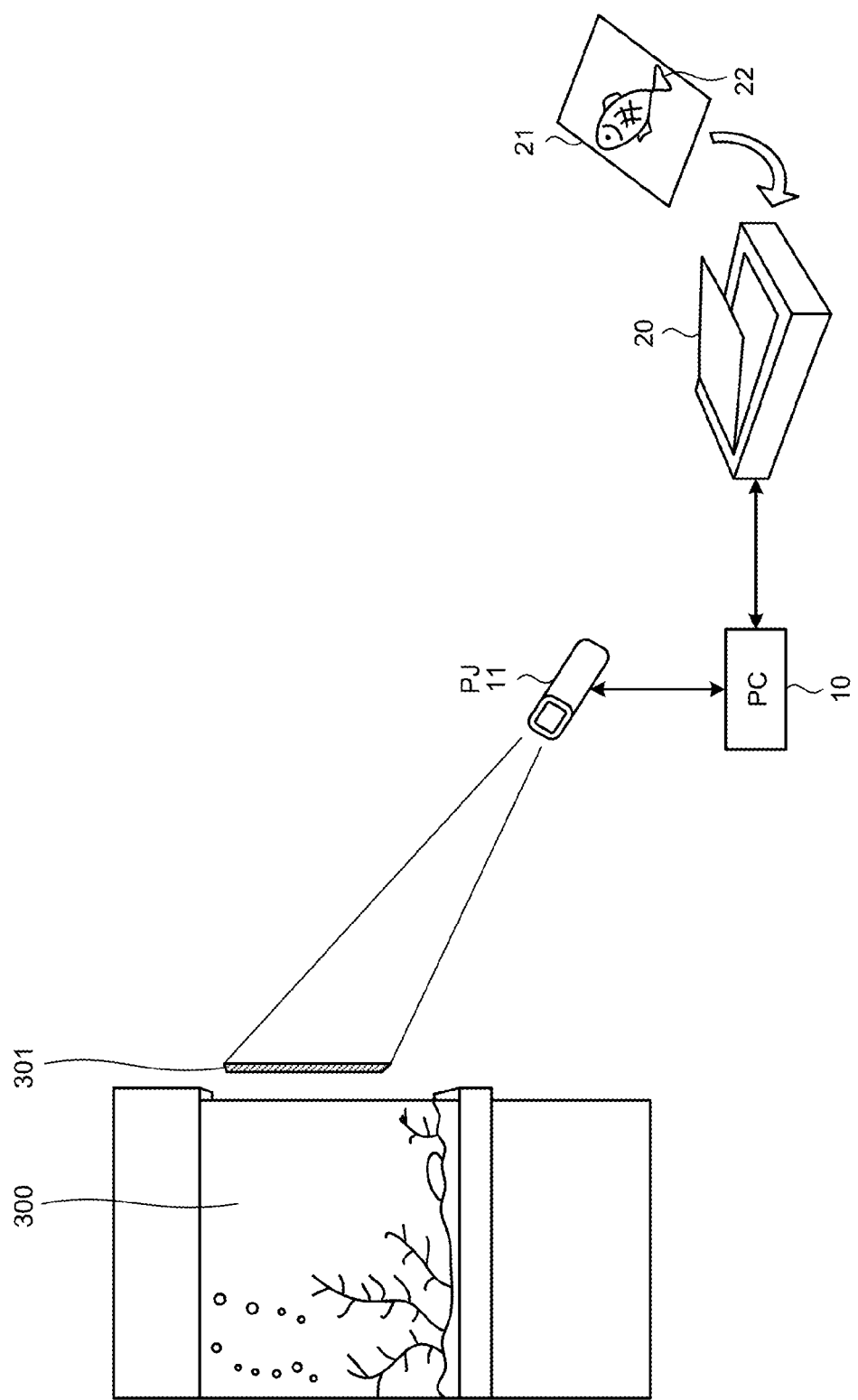
FIG. 16 is a diagram for describing a first modification of the embodiment.

How the image control unit 136 controls motion of the user's object in Step S16 is described below. FIG. 15 is a flowchart of an example procedure of controlling motion of one user's object (target user's object) by the image control unit 136 according to the embodiment. The image control unit 136 performs motion control through Steps S40 to S52 described below, in which the target user's object is deformed according to one of the first to third deformation modes assigned to the target user's object.

In Step S40, the image control unit 136 determines, based on the parameter $p_0$, whether or not the moving-direction velocity v of the target user's object has exceeded the maximum moving-direction velocity $v_{max}$. If the image control unit 136 determines that the velocity v has exceeded the maximum velocity $v_{max}$, the process proceeds to Step S42. If the image control unit 136 determines that the velocity v has not exceeded the maximum velocity $v_{max}$, the process proceeds to Step S41, in which the velocity v of the target user's object is increased by the moving-direction acceleration α. Thereafter, the process proceeds to Step S42.

In Step S42, the image control unit 136 determines, based on the parameter $p_2$, whether or not the angular acceleration αh in the horizontal plane has exceeded the maximum value $αh_{max}$. If the image control unit 136 determines that the angular acceleration αh has exceeded the maximum value $αh_{max}$, the process proceeds to Step S44.

If the image control unit 136 determines that the angular acceleration αh has not exceeded the maximum value $αh_{max}$, the process proceeds to Step S43. In Step S43, the image control unit 136 increases or decreases the angular acceleration αh of the target user's object in the horizontal plane to thereby change the changing rate of orientation in the horizontal plane.

More specifically, the image control unit 136 increases or decreases the angular acceleration αh by an amount that depends on a random number, which is generated to fall within a range between the parameter $p_7$, which is the maximum random number for rightward angle $dRr_{max}$, and the parameter $p_8$, which is the maximum random number for leftward angle $dRl_{max}$. The image control unit 136 increases or decreases the changing rate of orientation of the target user's object in the horizontal plane according to the amount, by which the angular acceleration αh in the horizontal plane is increased or decreased. When the changing rate of orientation in the horizontal plane has been changed, the process proceeds to Step S44.

In Step S44, the image control unit 136 determines, based on the parameter $p_3$, whether or not the angular acceleration αv in the vertical plane has exceeded the maximum value $aαv_{max}$. If the image control unit 136 determines that the angular acceleration αv has exceeded the maximum value $αv_{max}$, the process proceeds to Step S46.

If the image control unit 136 determines that the angular acceleration αv has not exceeded the maximum value $αv_{max}$, the process proceeds to Step S45. In Step S45, the image control unit 136 increases or decreases the angular acceleration αv of the target user's object in the vertical plane to thereby change the changing rate of orientation in the vertical plane.

More specifically, the image control unit 136 increases or decreases the angular acceleration αv by an amount that depends on a random number, which is generated to fall within a range between the parameter $p_5$, which is the maximum random number for upward angle $dRu_{max}$, and the parameter $p_6$, which is the maximum random number for downward angle $dRu_{max}$. The image control unit 136 increases or decreases the changing rate of orientation of the target user's object in the vertical plane according to the amount, by which the angular acceleration $\alpha v$ in the vertical plane is increased or decreased. When the changing rate of orientation in the vertical plane has been changed, the process proceeds to Step S46.

In Step S46, the image control unit 136 determines whether or not the target user's object has contacted the top or bottom wall (the ceiling or the floor) of the virtual aquarium 31. If the image control unit 136 determines that the target user's object has not contacted the top or bottom wall of the virtual aquarium 31, the process proceeds to Step S48.

If the image control unit 136 determines that the target user's object has contacted the top or bottom wall of the virtual aquarium 31, the process proceeds to Step S47. In Step S47, the image control unit 136 reverses the changing rate of orientation of the target user's object in the vertical plane and, simultaneously, decreases the moving-direction velocity v. Reversing the changing rate of orientation in the vertical plane is performed by reversing the direction of a vertical component of the moving direction while maintaining a horizontal component of the same. Thereafter, the process proceeds to Step S48.

In Step S48, the image control unit 136 determines whether or not the target user's object has contacted a front, back, right, or left wall of the virtual aquarium 31. If the image control unit 136 determines that the target user's object has not contacted the front, back, right, or left wall of the virtual aquarium 31, the process proceeds to Step S50.

If the image control unit 136 determines that the target user's object has contacted the front, back, right, or left wall of the virtual aquarium 31, the process proceeds to Step S49. In Step S49, the image control unit 136 increases the changing rate of orientation of the target user's object in the horizontal plane and, simultaneously, decreases the moving-direction velocity v. In this example, the image control unit 136 increases a changing rate of orientation of the moving-direction of the target user's object by ten times. Thereafter, the process proceeds to Step S50.

In Step S50, the image control unit 136 changes the orientation of the target user's object in the vertical plane according to the changing rate of orientation of the target user's object in the vertical plane. In next Step S51, the image control unit 136 changes orientation of the target user's object in the horizontal plane according to the changing rate of orientation of the target user's object in the horizontal plane. In next Step S52, the image control unit 136 changes the position (coordinates) of the target user's object according to the moving-direction velocity v. The image control unit 136 projects the virtual aquarium 31 onto the two-dimensional image-data plane, thereby updating the image on the two-dimensional image-data plane.

When the image control unit 136 completes processing of Step S52, the process is returned to Step S40. The image control unit 136 repeats processing from Steps S40 to S52 described above at predetermined intervals, e.g., at every frame period.

By performing the processes described above, the image control unit 136 can add vertical and horizontal fluctuation to the motion of the target user's object. Furthermore, the image control unit 136 causes the target user's object to move seamlessly after the user's object contacts a wall surface of the virtual aquarium 31. Consequently, the embodiment can move the user's object with a water-creature-like motion. Furthermore, the user's object is displayed within a screen according to the width $W_v$ at most times.

In the example described above, the display system 1 according to the embodiment projects the virtual aquarium 31 onto the two-dimensional plane by causing the plurality of projector devices 11₁, 11₂, and 11₃ to project the images 13₁, 13₂, and 13₃, into which a to-be-projected image is divided, onto the screen 12. However, applicable projection scheme is not limited thereto. For example, alternatively, the single projector apparatus 11 may project the single to-be-projected image, which is not divided, onto the screen 12.

In the example described above, a scene in which the user's object moves within the three-dimensional image-data space is projected onto (displayed on) the two-dimensional image-data plane. However, application of the embodiment is not necessarily limited to a three-dimensional image-data space region. For example, the embodiment may be applied to an image, in which user's object moves on a two-dimensional image-data plane. However, to create motion which appears as a creature swimming in a fish tank, a three-dimensional motion can give more real appearance than two-dimensional motion does. Accordingly, utilizing a three-dimensional image-data space region will be more suitable.

In the example described above, the user's object is based on an image representing a creature, such as fish, living in water. However, the user's object is not limited thereto. For example, the user's object may be based on an image of an insect, a plant, or the like.

In the example described above, the picture is made by a user by hand-drawing on a sheet with a marker pen or the like. However, a user may make a picture by another method. For example, a picture hand-drawn by a user may be made using a stylus pen and a tablet terminal, a finger (i.e., by finger touch operation) and a tablet terminal, or the like, rather than using a marker pen and a sheet. Put another way, a hand-drawn picture may be made by any method that allows a user to make a picture in a manner or by a method similar to that by which the user makes a picture using paper and a pen, and the type of the medium to be employed is not particularly limited.

First Modification of Embodiment

A first modification of the embodiment is described below. In the embodiment described above, the projector apparatus 11 projects the two-dimensional projection image of the virtual aquarium 31 onto the screen 12, which is plain and flat. However, a screen onto which the projection image is to be projected is not limited to the screen 12. For example, alternatively, the projector apparatus 11 may project a two-dimensional projection image of the virtual aquarium 31 onto a semi-transparent screen 301 placed over the whole area of an aquarium 300 where real fish and/or the like are swimming. An image of user's object projected onto the screen 301 is combined with the real fish in the aquarium 300 that can be seen through the semi-transparent screen 301. Consequently, a user can enjoy a sight to which more real appearance is given.

Second Modification of Embodiment

Figure 17:
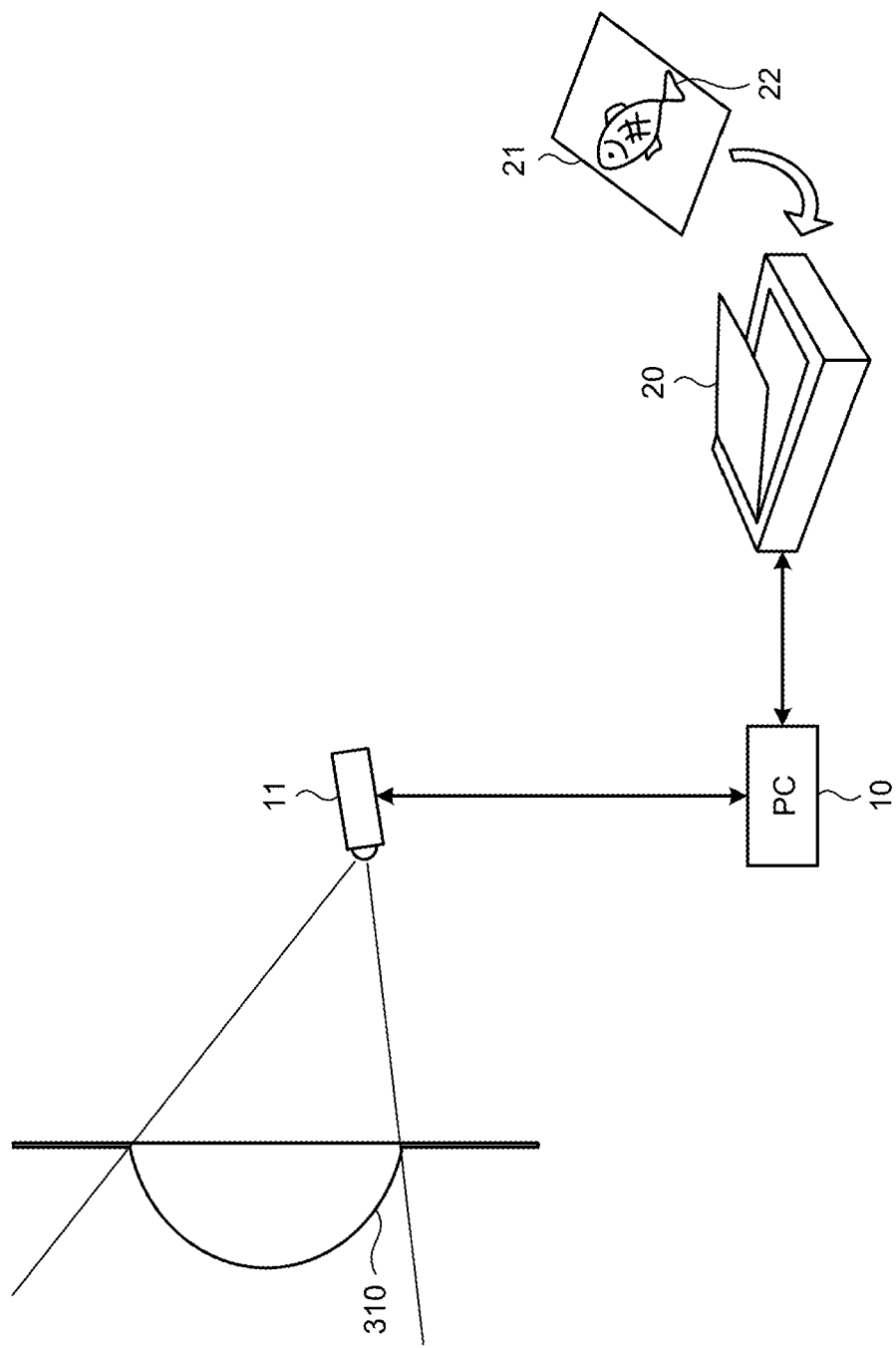
FIG. 17 is a diagram for describing a second modification of the embodiment.

A second modification of the embodiment is described below. A projection surface of the screen 12 is not necessarily flat, and may have a three-dimensional profile. For example, a screen 310 having a semi-spherical shape as illustrated in FIG. 17 may be employed. By causing the projector apparatus 11 to project a two-dimensional projection image of the virtual aquarium 31 onto the semi-spherical portion of the screen 310, more three-dimensional appearance can be given to the image of the inside of the virtual aquarium 31. In this case, a user can enjoy an experience as if the user looks into water through a window provided in water. Furthermore, the user can view a scene in which fish or the like represented by the picture 22 drawn by the user himself/herself appears to be swimming in water.

Third Modification of Embodiment

Figure 18:
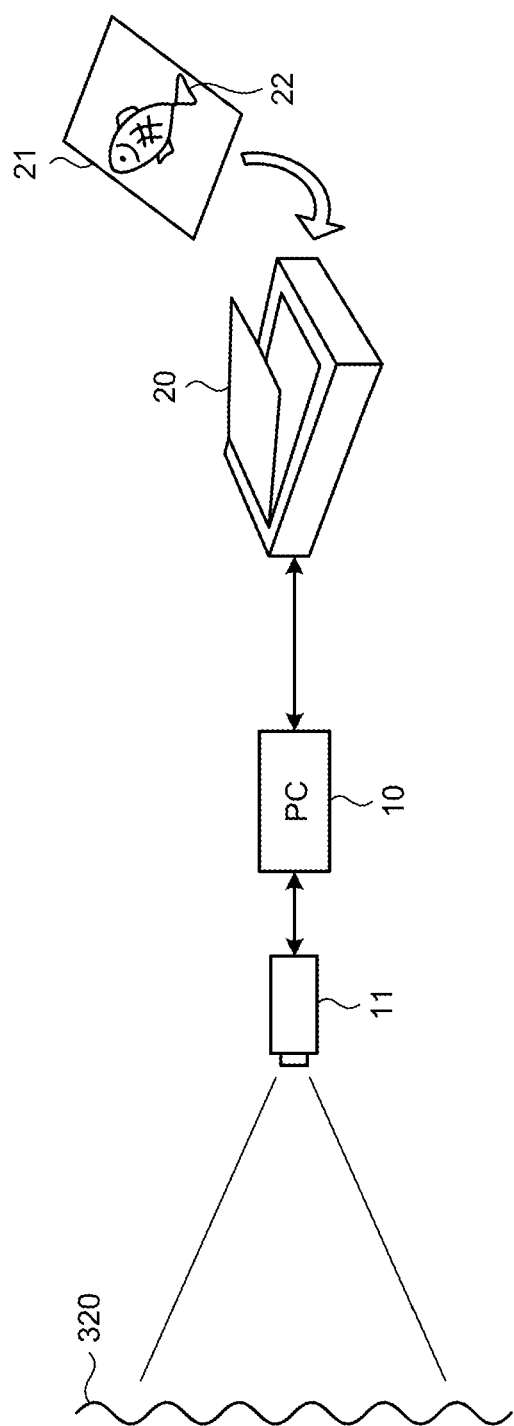
FIG. 18 is a diagram for describing a third modification of the embodiment.

A third modification of the embodiment is described below. The shape of the screen 12 is not necessarily fixed. For example, a screen 320, which is a hanging cloth as illustrated in FIG. 18, may be employed. In this case, the screen 320 is preferably not fixed at its bottom end so as to be easily swayed by wind or vibrations. When the projector apparatus 11 projects a projection image of the virtual aquarium 31 onto the screen 320, the swaying screen 320 can give more real appearance of an under-water scene to the image. In a situation where the projector apparatus 11 projects a projection image from the backside of the screen 320, and a viewing person is positioned between the screen 320 and the projector apparatus 11, a silhouette and user's object are displayed together. This can further increase entertainment value.

Fourth Modification of Embodiment

A fourth modification of the embodiment is described below. In the fourth modification of the embodiment, a background image is added to the virtual aquarium 31. For example, an object (hereinafter, "background object") having distance information (coordinate information) independent of user's object may be arranged in the virtual aquarium 31. Alternatively, a background object may be arranged parallel to the plane containing the height and the width at a position of the depth D in the virtual aquarium 31. The background object may be fixed or, alternatively, changed according to predetermined schedule. For example, the background object may be changed on a per-time-period basis (e.g., morning hours, day hours, and night hours) per day. Schedule according to which the background object is to be changed is not limited thereto. The background object may be changed at longer time intervals; e.g., on a per-season basis (spring, summer, fall, and winter) or for annual events. When scheduled as such, it is preferable that the background object is changed to an object suitable for the time period, season, annual event, or the like each time. Changing the background object in this manner allows a user to enjoy various scenes which vary according to time period, season, annual event, or the like.

Fifth Modification of Embodiment

A fifth modification of the embodiment is described below. The fifth modification of the embodiment is configured to allow a user to take an action on user's object in the virtual aquarium 31. In the embodiment, because it is assumed that the user's object is a creature living in water, possible actions taken by a user include giving food to the creature. More specifically, the user draws the picture 22 representing food on the document 21. The user adds information indicating that the picture 22 represents food to the document 21. This information may be added by, for example, embedding information indicating that the picture 22 represents food in at least one of the marks $220_1$ to $220_3$. The PC 10 generates an object (hereinafter, "food object") from the picture 22 of food based on a document image obtained by the scanner apparatus 20 by scanning an image of the document 21, on which the picture 22 of the food is drawn, and adds the food object into the virtual aquarium 31.

When adding the food object, the PC 10 assigns coordinates on the top wall (ceiling) or, more specifically, on the plane containing the width W and the depth D at the height H, to the food object as initial coordinates. However, the initial coordinates are not limited thereto, and coordinates of a position higher than the ceiling of the virtual aquarium 31 in the image-data space 30 may alternatively be assigned to the food object. The PC 10 defines, as the motion of the food object, motion of moving (falling) from the initial coordinates of the food object in the image-data space 30. Motion, through which the moving food object is swayed due to resistance of water, may be further added to the food object.

Such motion control of the food may be performed by: making determination as to whether an image representing a hand-drawn picture, which is obtained by scanning a document image from a sheet, is a food object or user's object; and setting the parameters $p_0$ to $p_8$ differently depending on whether the image represents a food object or user's object. More specifically, the parameters $p_0$ to $p_8$ may be set as follows. If the image represents a food object, predetermined falling-motion values are set as the parameters $p_0$ to $p_8$. On the other hand, if the image represents user's object, the parameters $p_0$ to $p_8$ are set by utilizing the mode determination and the feature values described above.

Furthermore, the PC 10 adds motion to each of user's objects according to the food object in the virtual aquarium 31. For example, the PC 10 may add motion of approaching the food object to user's object according to a distance between the user's object and the food object. More specifically, the user's object is moved such that the closer the user's object, the faster the user's object approaches the food object. Furthermore, the PC 10 may delete the food object from the virtual aquarium 31 when one of the user's objects contacts the food object. By deleting the food object in this manner, a scene in which, for example, fish represented by the user's object has eaten the food can be created.

Such motion control may be implemented as follows, for example. The PC 10 manages all the objects by associating each object with identification information indicating whether the object is a food object or user's object. The PC 10 calculates distances from coordinates of every food object and every user's object. The PC 10 determines whether the calculated distance is equal to or smaller than a threshold value for each of the distances. If the PC 10 determines that a calculated distance is equal to or smaller than the threshold value, the PC 10 increases the parameter(s) (e.g., the parameters $p_0$ and $p_1$) related to the moving-direction velocity of the corresponding user's object.

The PC 10 may further control the user's object, for which the parameter(s) related to the velocity has been increased according to a result of the determination, as follows. The PC 10 sets a flag indicating that the parameter(s) has been increased for the user's object and monitors the flagged user's object. When it is determined that the distance between the flagged user's object and the food object has become equal to or larger than the threshold value or zero, the PC 10 decreases the parameter(s) (e.g., the $p_0$ and $p_1$) related to the moving-direction velocity. Meanwhile, in a case where the food object is deleted, the distance between the user's object and the food object is set to zero.

The control method described above causes the moving-direction velocity of the user's object to decrease when the distance between the flagged user's object and the food object has become equal to or larger than the threshold value, for example. As a result, a scene in which the creature represented by the user's object moving away from the food object appears to become less active can be created. Furthermore, the control method described above causes a moving-direction velocity of the creature represented by the user's object to decrease when the distance between the flagged user's object and the food object has become zero, for example. As a result, a scene in which the creature appears to give up eating the food object because the food has disappeared can be created.

The PC 10 can cause motion of user's object to vary between before and after the user's object contacts a food object. For example, the velocity of the user's object may be increased after the user's object contacts the food object. The moving direction of the user's object may be changed after the user's object contacts the food object. For another example, the user's object may be increased in size after the user's object contacts the food object.

As described above, the fifth modification of the embodiment is configured to change the motion of each of user's objects in the virtual aquarium 31 according to an action taken by a user. As a result, the entertainment value can be further increased.

Sixth Modification of Embodiment

A sixth modification of the embodiment is described below. In the sixth modification of the embodiment, a decorative object, which is based on the picture 22 drawn by a user on the document 21, is arranged in the virtual aquarium 31. More specifically, the user draws the picture 22 representing a decorative object, such as an ornament rock or seaweed, on the document 21. The user adds information indicating that the picture 22 represents the decorative object to the document 21. The PC 10 generates an object (hereinafter, "decorative object") from the picture 22 representing the decorative object based on a document image obtained by the scanner apparatus 20 by scanning an image of the document 21, on which the picture 22 of the decorative object is drawn, and adds the decorative object into the virtual aquarium 31.

When adding the decorative object, the PC 10 assigns coordinates on the bottom wall (floor) or, more specifically, on the plane containing the width W and the depth D at the height zero, to the decorative object as initial coordinates. The PC 10 does not define motion according to which the decorative object is displaced. In other words, the decorative object is positionally fixed in the virtual aquarium 31. Meanwhile, a vertically extending and contracting motion may be added to the decorative object as in the case of the second deformation mode described above.

According to an embodiment, image processing technique can be improved to make it possible to display user's image, which is made by a general user by hand-drawing, such that the user's image is moved in a more lifelike manner.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control method comprising:
inputting user's image including a drawing portion made by hand drawing and being a display target image;
determining a deformation mode based on which the user's image is to be deformed continuously with lapse of time, according to a shape of the user's image; and
performing image control including,
causing the input user's image to emerge on a display region, on which the user's image is to be displayed, and
moving the user's image based on the deformation mode, wherein
in the determining, one of a first mode, a second mode, and a third mode is determined as the deformation mode according to a ratio of a horizontal size to a vertical size of the user's image,
the first mode is a mode in which one of two parts, into which the user's image is vertically divided, is deformed in a front and back direction with respect to a plane of the user's image,
the second mode is a mode in which the user's image is deformed by being vertically extended and contracted, and
the third mode being a mode in which one of two parts, into which the user's image is horizontally divided, is deformed parallel to the plane of the user's image.

2. The display control method according to claim 1, further comprising:
defining a defined region with a height, a width, and a depth, with respect to a data space with a three-dimensional coordinate system; and
obtaining an image of an inside of the defined region from an eye point, which is located outside the defined region and faces a plane containing the width and the height, with an angular field of view excluding at least any one of a part of the width and a part of the height, wherein
the performing image control includes,
assigning, to the user's image input at the inputting, coordinates in a dead angle zone in a dead angle of the angular field of view in the defined region as initial coordinates,
changing the coordinates in the defined region continuously with lapse of time, and
displaying the user's image in the display region in accordance with the coordinates, thereby causing the input user's image to emerge from any one of a left end and a right end of the display region and moving the user's image that has emerged.

3. The display control method according to claim 2, wherein the performing image control includes changing motion of the user's image when the user's image contacts a boundary of the defined region.

4. The display control method according to claim 2, wherein the performing image control includes,
when the user's image contacts a boundary of the defined region in a width direction or a depth direction, increasing a changing rate of orientation of the user's image in a plane containing the width and the depth of the defined region and, simultaneously, decreasing a velocity in a moving direction of the user's object, and
when the user's image contacts the boundary of the defined region in a height direction, reversing a changing rate of orientation of the user's object in a plane containing a height axis of the defined region and, simultaneously, decreasing a velocity in a moving direction.

5. The display control method according to claim 1, wherein the performing image control includes,
causing the input user's image to emerge such that the user's image emerges from any one of a left end and a right end on the display region, and
moving the user's image that has emerged based on the deformation mode.

6. A display control device comprising:
a memory and a processor, the memory containing computer readable code that, when executed by the processor, configures the processor to,
input user's image including a drawing portion made by hand drawing and being a display target image,
determine a deformation mode based on which the user's image is to be deformed continuously with lapse of time, according to a shape of the user's image,
cause the user's image to emerge on a display region, on which the user's image is to be displayed, and
move the user's image based on the deformation mode, wherein
the processor determines one of a first mode, a second mode, and a third mode as the deformation mode according to a ratio of a horizontal size to a vertical size of the user's image,
the first mode is a mode in which one of two parts, into which the user's image is vertically divided, is deformed in a front and back direction with respect to a plane of the user's image,
the second mode is a mode in which the user's image is deformed by being vertically extended and contracted, and
the third mode is a mode in which one of two parts, into which the user's image is horizontally divided, is deformed parallel to the plane of the user's image.

7. The display control device according to claim 6, wherein the computer readable code, when executed, further configures the processor to,
define a defined region with a height, a width, and a depth, with respect to a data space with a three-dimensional coordinate system,
obtain an image of an inside of the defined region from an eye point, which is located outside the defined region and faces a plane containing the width and the height, with an angular field of view excluding at least any one of a part of the width and a part of the height,
assign, to the user's image input, coordinates in a dead angle zone iii a dead angle of the angular field of view in the defined region as initial coordinates,
change the coordinates within the defined region continuously with lapse of time, and
display the user's image in the display region in accordance with the coordinates, thereby causing the input user's image to emerge from any one of a left end and a right end of the display region and moving the user's image that has emerged.

8. The display control device according to claim 7, wherein the computer readable code, when executed, further configures the processor to, change motion of the user's image when the user's image contacts a boundary of the defined region.

9. The display control device according to claim 7, wherein the computer readable code, when executed, further configures the processor to,
when the user's image contacts a boundary of the defined region in a width direction or a depth direction, increase a changing rate of orientation of the user's image in a plane containing the width and the depth of the defined region and, simultaneously, decreases a velocity in a moving direction of the user's object, and
when the user's image contacts the boundary of the defined region in a height direction, reverse a changing rate of orientation of the user's object in a plane containing a height axis of the defined region and, simultaneously, decreases a velocity in a moving direction.

10. The display control device according to claim 6, wherein the computer readable code, when executed, configures the processor to,
cause the user's image to emerge such that the user's image emerges from any one of a left end and a right end on the display region, and
move the user's image that has emerged based on the deformation mode.

11. A display system comprising:
an image input apparatus including an image input device, through which an image including a drawing portion made by hand drawing is input;
at least one display apparatus including a display device that displays an image; and
an image processing apparatus including a memory and a processor, the memory containing computer readable code that, when executed by the processor, configures the processor to,
determine a deformation mode based on which the user's image is to be deformed continuously with lapse of time, according to a shape of the user's image,
input user's image including the drawing portion made by hand drawing and being a display target image, originating from the image input through the image input apparatus,
cause the input user's image to emerge on a display region, on which the user's image is to be displayed, and
move the user's image based on the deformation mode, wherein
the processor determines one of a first mode, a second mode, and a third mode as the deformation mode according to a ratio of a horizontal size to a vertical size of the user's image,
the first mode is a mode in which one of two parts, into which the user's image is vertically divided, is deformed in a front and back direction with respect to a plane of the user's image, the second mode is a mode in which the user's image is deformed by being vertically extended and contracted, and the third mode is a mode in which one of two parts, into which the user's image is horizontally divided, is deformed parallel to the plane of the user's image.

12. The display system according to claim 11, wherein the computer readable code, when executed, further configures the processor to, a define a defined region with a height, a width, and a depth, with respect to a data space with a three-dimensional coordinate system, obtain an image of an inside of the defined region from an eye point, which is located outside the defined region and faces a plane containing the width and the height, with an angular field of view excluding at least any one of a part of the width and a part of the height, assign, to the user's image input input with the input unit, coordinates in a dead angle zone in a dead angle of the angular field of view in the defined region as initial coordinates, change the coordinates in the defined region continuously with lapse of time, and display the user's image in the display region in accordance with the coordinates, thereby causing the input user's image to emerge from any one of a left end and a right end of the display region and moving the user's image that. has emerged.

13. The display system according to claim 12, wherein the computer readable code, when executed, further configures the processor to change motion of the user's image when the user's image contacts a boundary of the defined region.

14. The display control device according to claim 12, wherein the computer readable code, when executed, further configures the processor to, when the user's image contacts a boundary of the defined region in a width direction or a depth direction, increase a changing rate of orientation of the user's image in a plane containing the width and the depth of the defined region and, simultaneously, decreases a velocity in a moving direction of the user's object, and when the user's image contacts the boundary of the defined region in a height direction, reverse a changing rate of orientation of the user's object in a plane containing a height axis of the defined region and, simultaneously, decreases a velocity in a moving direction.

15. The display system according to claim 11, wherein the computer readable code, when executed, configures the processor to, cause the user's image to emerge such that the user's image emerges from any one of a left end and a right end on the display region, and move the user's image that has emerged based on the deformation mode.

* * * * *